(12) United States Patent
Zaderej

(10) Patent No.: US 7,214,067 B2
(45) Date of Patent: May 8, 2007

(54) HINGE CONNECTOR FOR ELECTRONIC DEVICES

(75) Inventor: Victor Zaderej, St. Charles, IL (US)

(73) Assignee: Molex Incorporated, Lisle, IL (US)

(*) Notice: Subject to any disclaimer, the term of this patent is extended or adjusted under 35 U.S.C. 154(b) by 0 days.

(21) Appl. No.: 10/517,395

(22) PCT Filed: May 16, 2003

(86) PCT No.: PCT/US03/15298

§ 371 (c)(1),
(2), (4) Date: Aug. 24, 2005

(87) PCT Pub. No.: WO03/100792

PCT Pub. Date: Dec. 4, 2003

(65) Prior Publication Data

US 2006/0048340 A1    Mar. 9, 2006

Related U.S. Application Data

(60) Provisional application No. 60/383,055, filed on May 24, 2002.

(51) Int. Cl.
*H01R 39/00* (2006.01)
(52) U.S. Cl. .............................. 439/31; 439/165
(58) Field of Classification Search ............... 439/31, 439/165, 11, 13; 361/755
See application file for complete search history.

(56) References Cited

U.S. PATENT DOCUMENTS

| 3,860,312 | A | * | 1/1975 | Gordon, Jr. ............... 439/31 |
| 4,643,508 | A | * | 2/1987 | Schaller ................... 439/31 |
| 4,764,121 | A | * | 8/1988 | Ditzig ..................... 439/21 |
| 4,854,881 | A | * | 8/1989 | Ditzig ..................... 439/26 |
| 4,865,553 | A | * | 9/1989 | Tanigawa et al. .......... 439/31 |
| 5,026,289 | A | * | 6/1991 | Matsumoto et al. ........ 439/15 |
| 5,278,993 | A | * | 1/1994 | Reiff et al. ............. 455/575.3 |
| 5,382,172 | A | * | 1/1995 | Klier et al. ............. 439/164 |

(Continued)

FOREIGN PATENT DOCUMENTS

EP    1147783    * 10/2001

(Continued)

OTHER PUBLICATIONS

IBM Technical Discloser Bulletin, IBM Corp. New York, US vol. 34, No. 9, pp. 29-32 Feb. 1, 1992.*

*Primary Examiner*—Neil Abrams
*Assistant Examiner*—Harshad C Patel
(74) *Attorney, Agent, or Firm*—Robert J. Zeitler

(57) ABSTRACT

A hinge for an electronic device, such as a notebook computer, a personal digital assistant, a cellular telephone, a portable compact disc player and the like, includes a body member and at least one contact provided on the body member. Structure is provided for electrically connecting each contact to a first portion of the electronic device. Structure is also provided for connecting each contact to a second portion of the electronic device. The hinge can be repeatedly used without wear or rubbing action because the ends of the contacts always remain connected to the electrical components of the upper and lower portions of the electronic device. If damaged, only the hinge needs to be replaced and the connections to the electronic device reinstated.

24 Claims, 17 Drawing Sheets

U.S. PATENT DOCUMENTS

| | | | |
|---|---|---|---|
| 5,630,724 A * | 5/1997 | Lange et al. | 439/164 |
| 5,681,176 A * | 10/1997 | Ibaraki et al. | 439/165 |
| 5,995,373 A * | 11/1999 | Nagai | 361/755 |
| 6,272,324 B1 * | 8/2001 | Rudisill et al. | 455/575.8 |
| 6,415,168 B1 * | 7/2002 | Putz | 600/378 |

FOREIGN PATENT DOCUMENTS

| | | | |
|---|---|---|---|
| GB | 2073961 | * | 8/1988 |

* cited by examiner

HINGE CONNECTOR FOR ELECTRONIC DEVICES

RELATED APPLICATIONS

This application claims the domestic priority of U.S. provisional application Ser. No. 60/383,055 filed on May 24, 2002.

FIELD OF THE INVENTION

This invention relates to a hinge interconnect, and more particularly, to a hinge interconnect for electrically connecting two halves of an electronic device together.

BACKGROUND OF THE INVENTION

Electronic devices, such as notebook computers, personal digital assistants (PDAs), cellular telephones, portable compact disc (CD) players and the like, are often designed with flip-up covers into which electronic components are added. These electronic components must be electrically connected to the electronic components in the other half of the electronic device through a hinged interface. There may be as many as fifty signals or more that are required to be interconnected between these halves.

Prior art electronic devices interconnect the electronic components in the halves by flexible circuits that are routed through the hinge and mated to the printed wiring boards (PWBs) or displays on the opposite half. These flex circuits are expensive, are difficult to install in the hinge and require manual labor, and have reliability issues. The hinge and the interconnect therethrough have one of the highest reliability problems for these types of electronic devices.

Often, if the hinge and/or flex circuit fails, the entire device is disposed of instead of replacing the damaged components. As color displays are being used in more electronic devices, the replacement of the entire electronic device is not cost effective.

The present invention provides a hinge interconnect that provides a solution to these problems. Other features and advantages will become apparent upon reading the attached description of the invention, in combination with a study of the drawings.

SUMMARY OF THE INVENTION

An object of the present invention is to provide an electrical connector for use in a hinge of an electronic device, such as a notebook computer, a personal digital assistant (PDA), a cellular telephone, a portable compact disc (CD) player and the like, which is reliable in use.

Another object of the present invention is to provide an electrical connector for use in a hinge of an electronic device, such as a notebook computer, a personal digital assistant (PDA), a cellular telephone, a portable compact disc (CD) player and the like, which can be easily replaced if damaged Other objects, features and advantages of the invention will be apparent from the following detailed description taken in connection with the accompanying drawings.

BRIEF DESCRIPTION OF THE DRAWINGS

The invention, together with its objects and the advantages thereof, may be best understood by reference to the following description taken in conjunction with the accompanying drawings, in which like reference numerals identify like elements in the figures and in which.

DETAILED DESCRIPTION OF THE PREFERRED EMBODIMENTS

Figure 1:
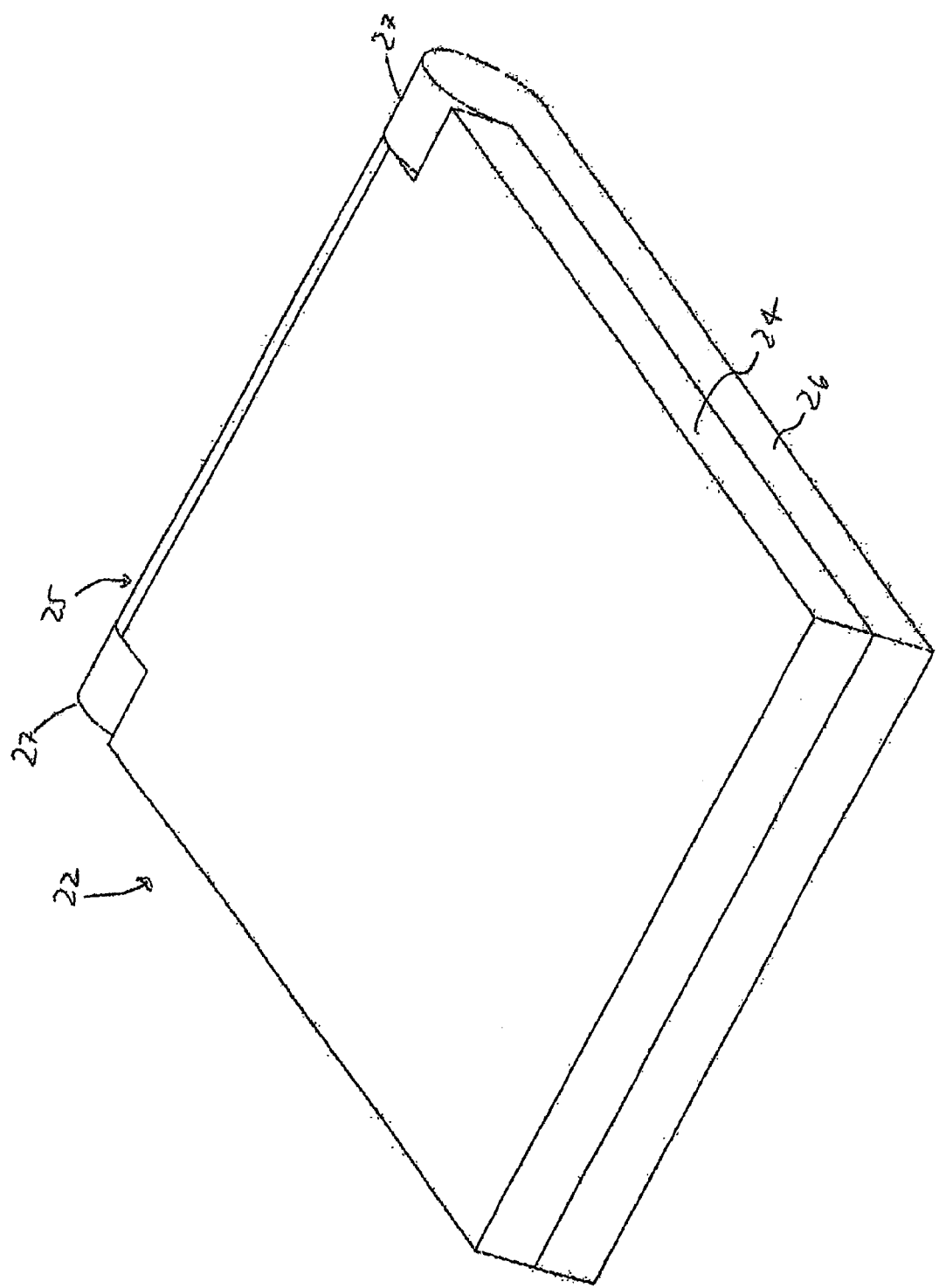
FIG. 1 is a perspective view of an electronic device having a flip-up cover.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

Figure 2:
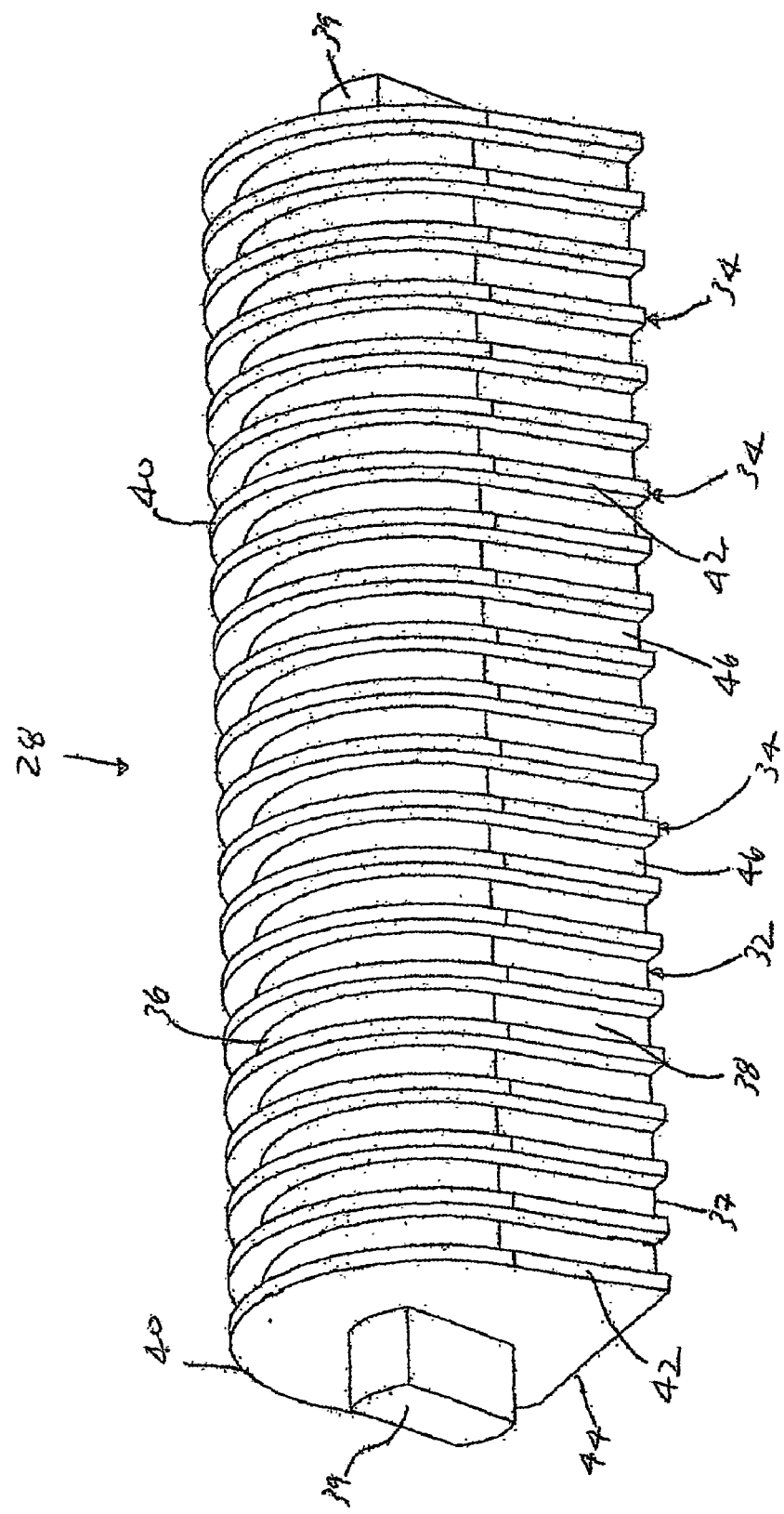
FIG. 2 is a perspective view of the first member of one embodiment of the hinge connector of the present application.
Figure 3:
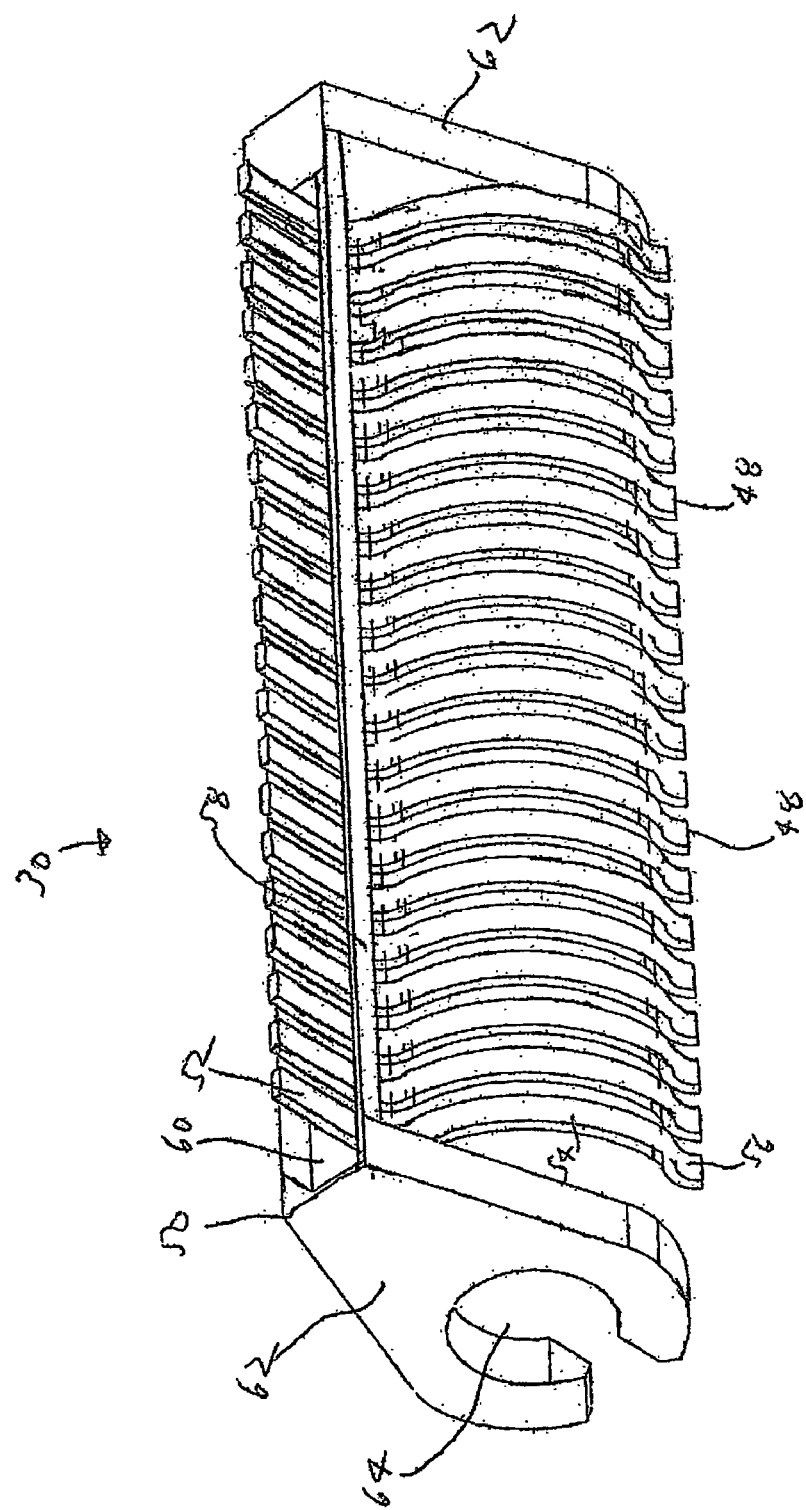
FIG. 3 is a perspective view of the second member of one embodiment of the hinge connector of the present application.
Figure 4:
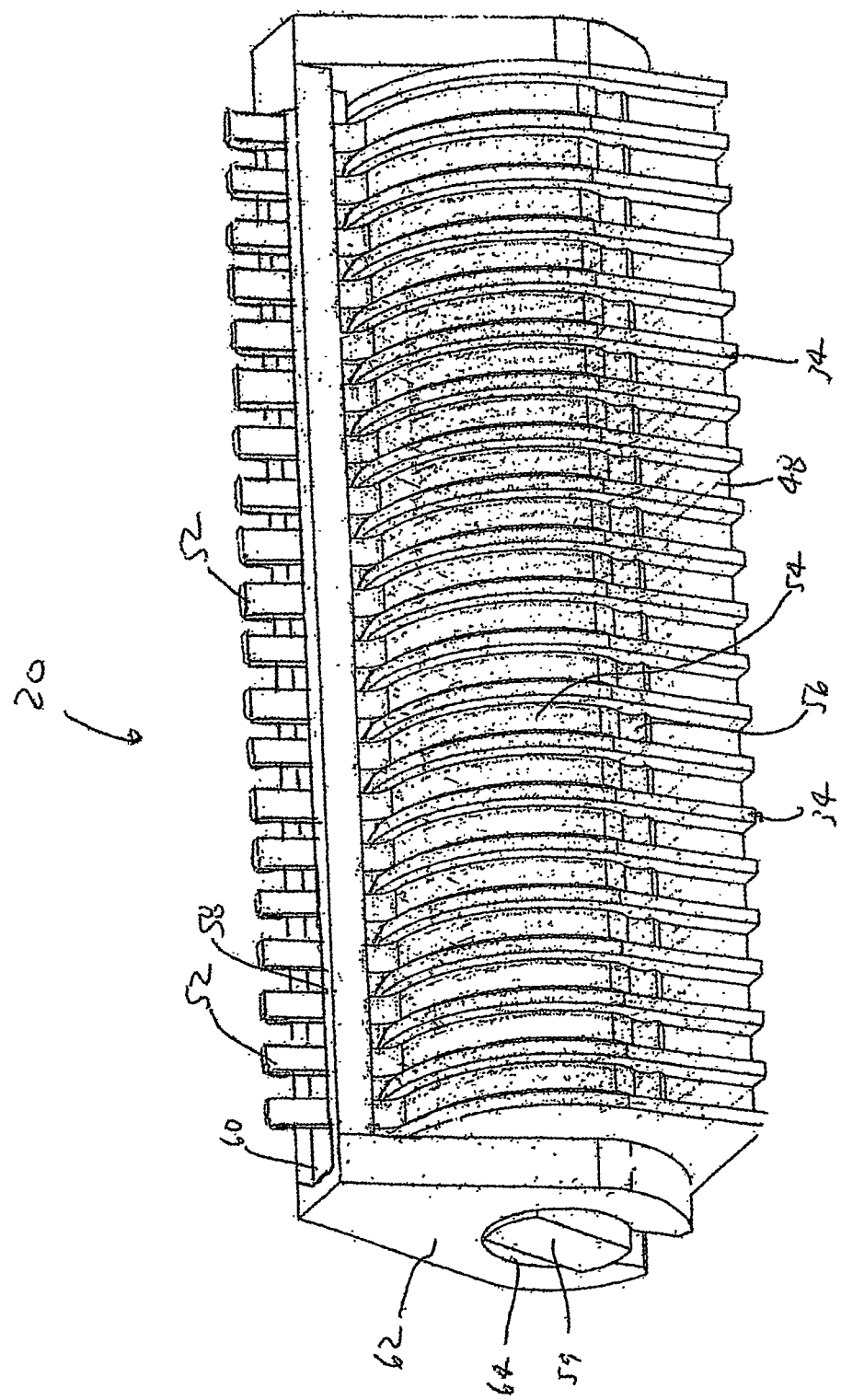
FIG. 4 is a perspective view of one embodiment of the hinge connector of the present application.
Figure 5:
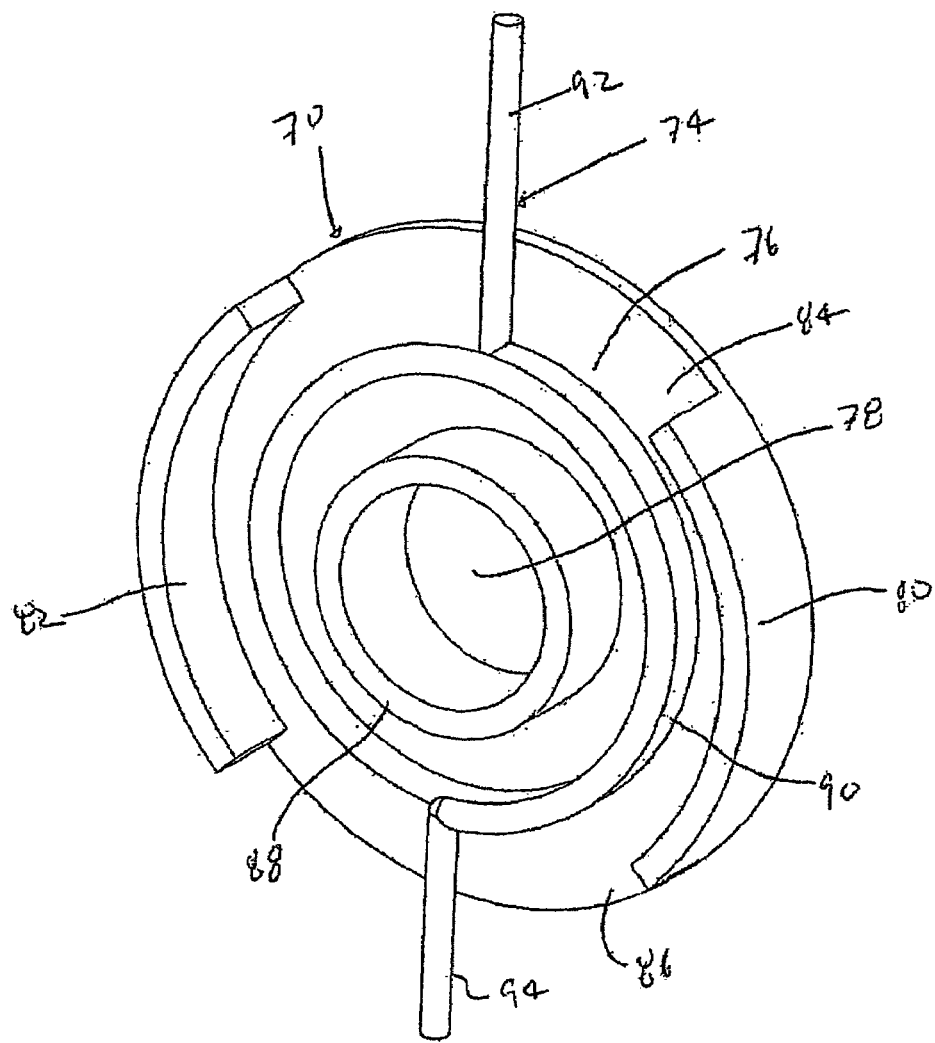
FIG. 5 is a perspective view of one bobbin portion of an alternative embodiment of the hinge connector of the present application.
Figure 6:
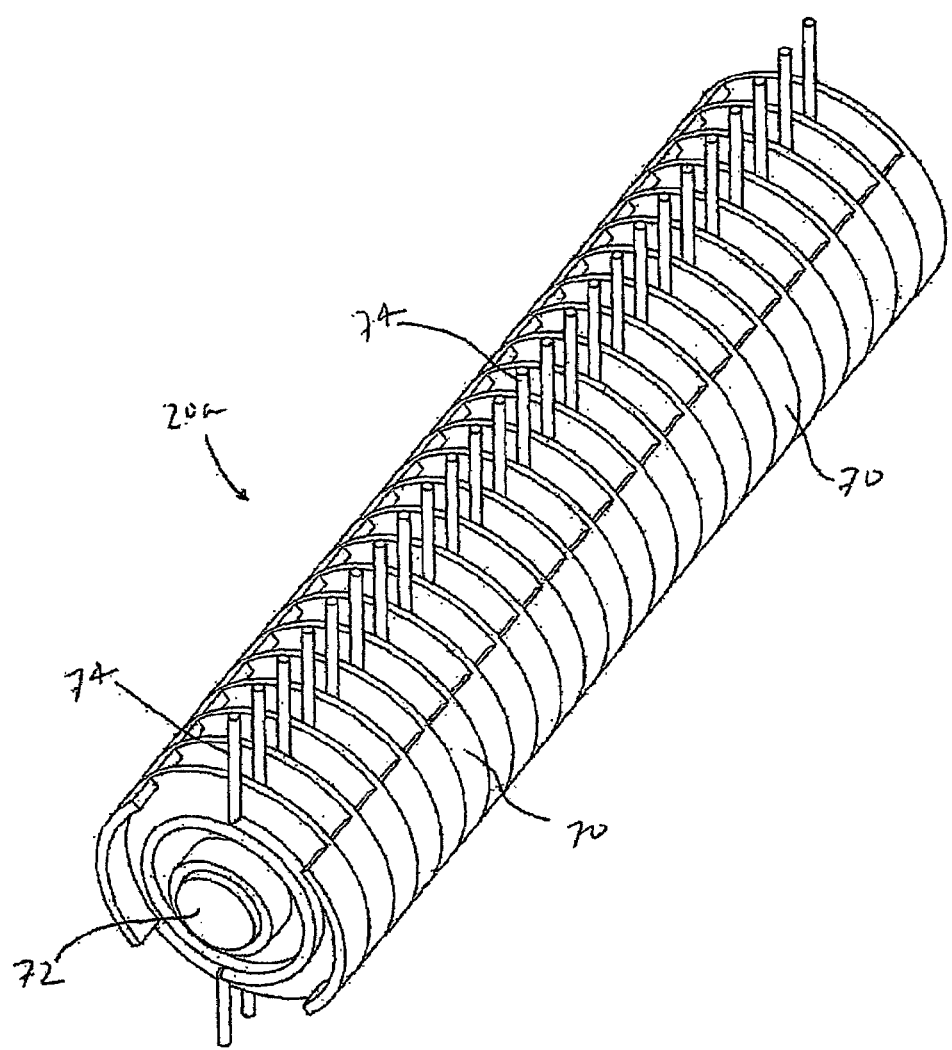
FIG. 6 is a perspective view of a plurality of bobbin portions of an alternative embodiment of the hinge connector of the present application placed on a pin member.
Figure 7:
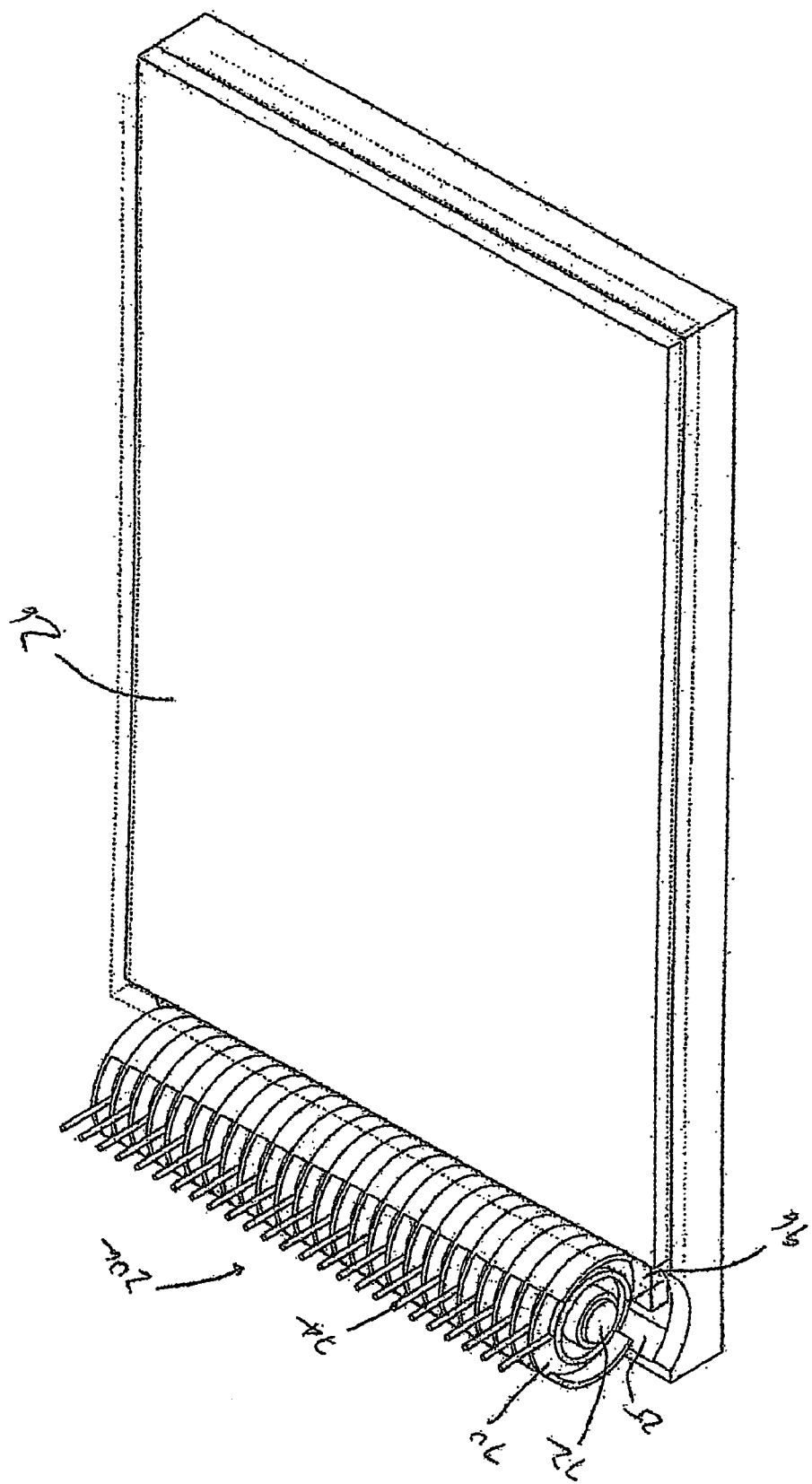
FIG. 7 is a perspective view of the hinge connector of FIG. 6 within the hinge receiving space.
Figure 16:
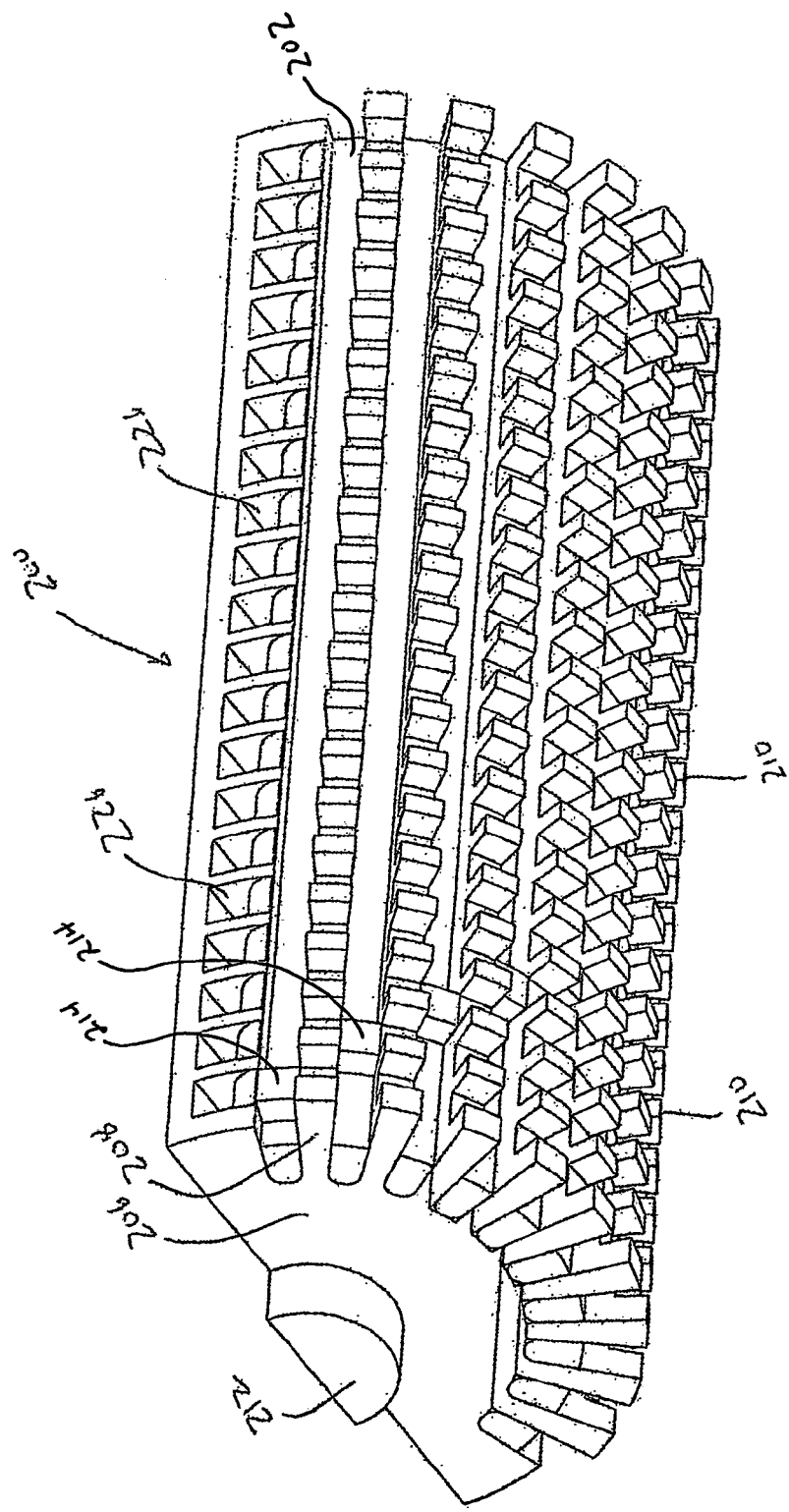
FIG. 16 is a perspective view of the body member of a fourth embodiment of the hinge connector of the present application.
Figure 17:
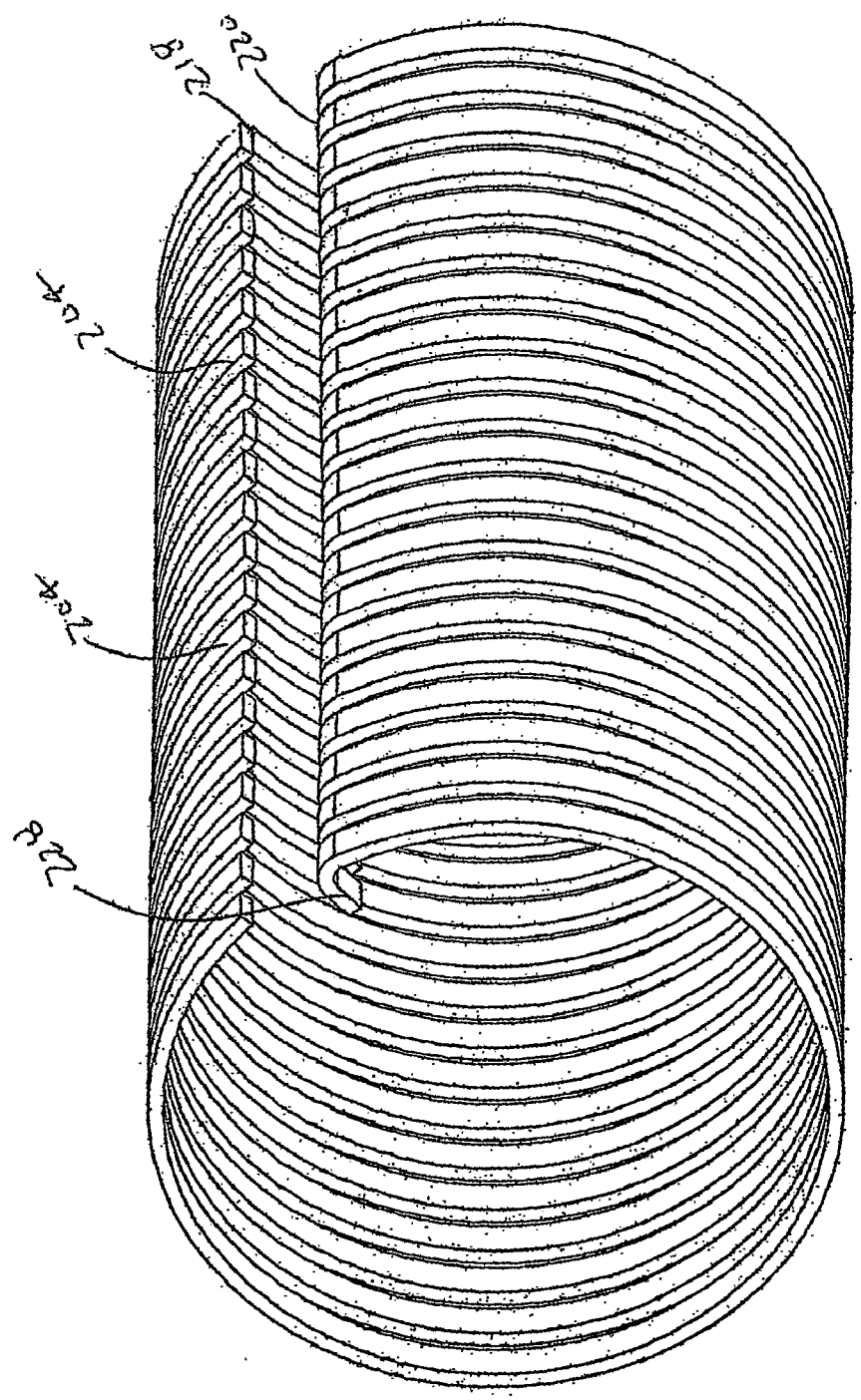
FIG. 17 is a perspective view of the contacts for use on the body member of a fourth embodiment of the hinge connector of the present application.

A hinge connector 20, 20a, 20b, 20c which incorporates the features described herein is used in an electronic device 22, such as a notebook computer, a personal digital assistant (PDA), a cellular telephones, a portable compact disc (CD) player and the like, which has flip-up cover 24. As shown in FIG. 1, the electronic device 22 includes an first half 24, i.e. the flip-up cover, and a second half 26 which are coupled by the hinge connector 20, 20a, 20b, 20c which is mounted into a hinge receiving space 25 between the first and second halves 24, 26. The first and second halves 24, 26 can be otherwise connected together by interconnecting components provided within curved portions 27 between the first and second halves 24, 26. Electronic components are provided in each half 24, 26 of the electronic device 22 and are coupled through the hinge connector 20, 20a, 20b, 20c. As such, the first half 24 of the electronic device 22 can close onto the second half 26 by rotation around the hinge connector 20,20a, 20b, 20c. A first embodiment of the hinge connector 20 of the present invention is shown in FIGS. 2–4. A second embodiment of the hinge connector 20a of the present invention is shown in FIGS. 5–7. A third embodiment of the hinge connector 20b of the present invention is shown in FIGS. 8–15. A variation of the third embodiment which forms a fourth embodiment of the hinge connector 20c is shown in FIGS. 16 and 17.

Attention is invited to the first embodiment of the hinge connector 20 shown in FIGS. 2–4. The hinge connector 20 forms a surface mountable device that is mounted within the hinge receiving portion 25 of the electronic device 22 and is electrically connected to the electronic component in the first half 24 of the electronic device 22 and electrically connected to the printed wiring board (PWB) in the second half 26 of the electronic device 22. The hinge connector 20 includes a first, or body, member 28, as is most clearly shown in FIG. 2, and a second, or contact, member 30, as is most clearly shown in FIG. 3, which are mated together, as is most clearly shown in FIG. 4, to form the hinge connector 20.

The body member 28 is elongated and has a base 32 and a plurality of spaced apart ribs 34 provided on and extending from the base 32. In cross-section, the base 32 has an arcuate section 36 which connects to an angled section 38 that slopes downwardly and outwardly from the arcuate section 36 when viewed in FIG. 2, and a flat section 37. The flat section is angled approximately 70° relative to the angled section 38. On each end of the base 32, a protrusion 39 is provided for mounting the body member 28 into the space provided between the first and second halves 24, 26 of the electronic device 22. In cross-section, each rib 34 has an arcuate section 40 which connects to an angled section 42 that slopes downwardly and outwardly from the arcuate section 40 when viewed in FIG. 2, and a flat section 44. The flat section 44 is angled approximately 70° relative to the angled section 42. The arcuate sections 40 of the ribs 34 are aligned with the arcuate section 36 of the base 32 and have the same general shape as the arcuate section 36 of the base 32, but extends outwardly therefrom. Likewise, the angled sections 42 of the ribs 34 are aligned with the angled section 38 of the base 32 and have the same general shape as the angled section 38 of the base 32, but extends outwardly therefrom. The flat sections 44 of the ribs 34 are aligned with the flat section of the base 32 and are generally flush therewith.

The portions 46 of the base 32 that are exposed between adjacent ribs 34 form tracks and are metalized by suitable means. The flat sections 37 of the portions 46 are soldered to the PWB. To produce the body member 28, a two shot molding process can be used. A non-platable material is first molded to form the base 32 and the ribs 34. Thereafter, the portions 46 of the base 32 which are exposed between adjacent ribs 34 are molded with a platable material. Next, the body member 28 is plated such that plating is only formed between the ribs 32.

The contact member 30 includes a plurality of conductive contacts 48 and a holder 50 which holds the contacts 48 spaced apart from each other. When the contact member 30 is attached to the body member 28, the contacts 48 abuts against the respective portions 46 to provide a continuous electrical connection between the contact member 30 and the body member 28.

The contacts 48 may be stamped from metal and formed. Each contact 48 includes an end section 52, a first arcuate section 54 which extends from an end of and is angled relative to the end section 52, and a second arcuate section 56 which extends from the opposite end of the first arcuate section 54. The first arcuate section 54 is concave. The second arcuate section 56 is convex such that it curves away from the portions 46 when the contact member 30 is attached to the body member 28. Alternatively, the contacts 48 may be made from a generally non-conductive material having conductive plating at the appropriate locations.

The holder 50 may be formed from a dielectric material, such as plastic, and includes a pair of elongated rails 58, 60 between which the end sections 52 of the contacts 48 are held. The end sections 52 of the contacts 48 extend outwardly from the holder 50. The end sections 52 of the contacts 48 are attached between the rails 58, 60 by insert molding or by press fit. A connecting section 62 extends perpendicularly from the ends of the rails 58, 60 and has a recess 64 provided therein into which the respective protrusion 39 is held.

When the body member 28 and the contact member 30 are mated together, as shown in FIG. 4, the connecting sections 62 abut against either end of the body member 28 and the respective protrusion 39 is held within the recess 64 in the connecting sections 62. The second arcuate section 56 of the contacts 48 abut against the portions 46. The contact member 30 can rotate a total distance of about 170° relative to the body member 28.

When the hinge connector 20 is mounted in the hinge receiving space 25, the free ends of the end sections 52 of the contact member 30 are mated to the electrical components in the first half 24 of the electronic device 22 by suitable means, such as soldering or by use of a suitable connector, and the end sections of the portions 46 of the body member 28 are mated to the PWB in the second half 26 of the electronic device 22 by suitable means, such as soldering.

When the first half 24 is rotated relative to the second half 26 of the electronic device 22, the hinge connector 20 provides for continuous electrical continuity between the two halves 24, 26. The contacts 48 will slide along the portions 46 as the first half 24 is rotated relative to the second half 26 of the electronic device 22. The hinge connector 20 is very reliable and will withstand repeated rotation.

If the hinge connector 20 becomes damaged, only the hinge connector 20 will need to be replaced and the connections between the first and second halves 24, 26 reinstated. The entire electronic device 22 does not need to be discarded as the hinge connector is capable of being removably inserted into the hinge receiving space 25.

Attention is invited to an alternative embodiment of the hinge connector 20a shown in FIGS. 5–7. The hinge connector 20a includes a plurality of bobbins or body members 70 which are connected together by a pin 72. The body members 70 and the pin 72 are formed from a dielectric material, such as plastic. A conductive contact 74 is mounted on each body member 70. Any number of body members 70 may be used to form the hinge connector of this embodiment.

The body member 70 includes a circular base wall 76 which has an aperture 78 therethrough. A first arcuate wall 80 depends from the circular base wall 76 along a portion of the perimeter of the circular base wall 76 in a first direction. A second arcuate wall 82 depends from the circular base wall 76 along a portion of the perimeter of the circular base wall 76 in the first direction and is diametrically opposed from the first arcuate wall 80. Spaces 84, 86 are provided between the first arcuate wall 80 and the second arcuate wall 82. A cylindrical wall 88 depends from the circular base wall 76 along the perimeter of the aperture 78 in the first direction. As such, the first arcuate wall 80, the second arcuate wall 82 and the cylindrical wall 84 depend from the circular base wall 76 in the same direction. The opposite side of the circular base wall 76 does not have any protrusions such that it is flat. The body member 70 can be formed by molding.

The contact 74 is a coil spring which includes circular coils 90, a first end portion 92 extending from one end of the circular coils 90 and a second end portion 94 extending from the opposite end of the circular coils 90.

When the contact 74 is mounted in the body member 70, the coils 90 are located in the space between the arcuate walls 80, 82 and the cylindrical wall 88. The first end portion 92 extends through the space 84 such that a section thereof extends outwardly from the body member 70, and the second end portion 94 extends through the space 86 such that a section thereof extends outwardly from the body member 70. In the unflexed condition, the coils 90 are spaced a predetermined distance away from the first arcuate wall 80, the second arcuate wall 82 and the cylindrical wall 88.

To form the hinge connector 20a, any number of body members 70 with the contacts 74 provided thereon may be abutted against each other such that at least one of the first arcuate wall 80, the second arcuate wall 82 and the cylindrical wall 84 of the respective body member 70 abuts against the flat side of the circular base wall 76 and the apertures 78 are aligned. The pin 72 is inserted through the apertures 78 to hold the body members 70 with the contacts 72 provided thereon together. The hinge connector 20a is mounted in the hinge receiving space 25. Suitable means for attaching the pin 72 to the first or second half 24, 26 of the electronic device 22 may be provided.

The first ends 92 of the contacts 74 are mated to the electrical components in the first half 24 of the electronic device 22 by suitable means, such as soldering or by use of a suitable connector, and the second ends 94 of the contacts 74 are mated to the PWB 96 in the second half 26 of the electronic device 22 by suitable means, such as soldering or by use of a suitable connector, see FIG. 7.

When the first half 24 is rotated relative to the second half 26 of the electronic device 22, the hinge connector 20a provides for continuous electrical continuity between the two halves 24, 26. The coils 90 will contract or expand as necessary as the first half 24 is rotated relative to the second half 26 of the electronic device 22. The spaces 84, 86 allows for the first end 92 of the contact 74 to rotate a positive 80° to a negative 90° relative to the second end 94. The spacing provided between coils 90, the first arcuate wall 80, the second arcuate wall 82 and the cylindrical wall 84 provide for sufficient room for the coils 90 to contract or expand. The hinge connector 20a is very reliable and will withstand repeated rotation.

If the hinge connector 20a becomes damaged, only the hinge connector 20a will need to be replaced and the connections between the first and second halves 24, 26 reinstated. The entire electronic device 22 does not need to be discarded. In addition, the body member 70, and in particular the arcuate walls 80, 82, provide for the contact 74 to be substantially enclosed within the hinge receiving space 25.

In addition, the hinge connector 20a is modular. The length of the hinge connector 20a can be increased or decreased to accommodate the number of contacts required.

Moreover, no wear or rubbing action occurs because the ends 92, 94 of the spring coil 74 always remain connected to the electrical components of the first and second halves 24, 26 so there are no issues with contact wear or a need for precious metal interfaces. If desired, a detent (not shown), which is normally integrated into a spring-loaded feature of an electronic device, can be integrated into the hinge connector 20a which will provide for space and cost savings as the detent is now part of the hinge connector instead of being a separate structure.

Attention is invited to the another embodiment of the hinge connector 20b shown in FIGS. 8–15. The hinge connector 20b includes a barrel or body member 100 formed of a dielectric material, such as plastic, that has tracks 102 thereon and a plurality of conductive contacts 104 that are mated with the body member 100 and tracks 102.

Figure 8:
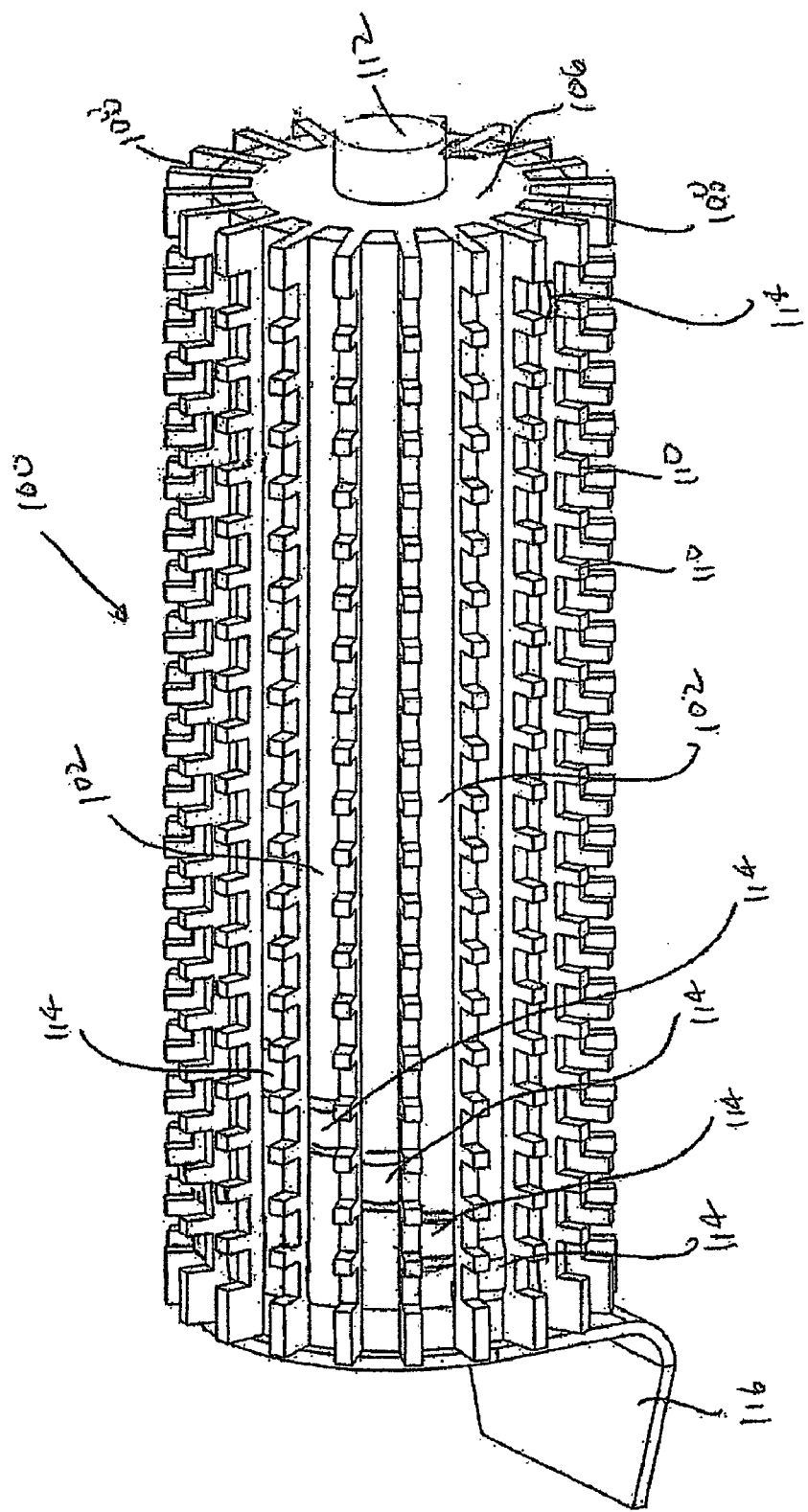
FIG. 8 is a perspective view of the body member of a third embodiment of the hinge connector of the present application.

As shown in FIG. 8, the body member 100 has a base 106, which is cylindrical in the embodiment shown, which has a plurality of spaced apart ribs 108 extending along the length thereof and around the circumference thereof. Each rib 108 extends radially outwardly from the cylindrical base 106. Each rib 108 has a plurality of spaced apart teeth 110 provided thereon along the length thereof. Each tooth 110 is generally square. The individual teeth 110 in the respective ribs 108 are aligned with each other around the circumference of the base 106. A protrusion 112 is provided at one end of the base 106. As such, the body member 100 has a plurality of rows (the portions between the ribs 108) and a plurality of columns (the aligned spaces between the teeth 110). As shown in FIG. 8, the rows and columns intersect each other. At least one of the ribs 108a, 108b, see FIG. 11, may be shorter than the remaining ribs 108 for reasons described herein.

A bump 114 is provided along each row. The bump 114 protrudes outwardly from the base 106 in the same direction as the ribs 108. The body member 100 may be formed such that the bumps 114 are staggered such that only one bump 114 is provided per row and column.

A circuit member, in this instance, a flex circuit 116, is attached to the ends of the tracks 102 opposite to the end that has the protrusion 112, by suitable means. The circuit member 116 is also electrically connected to the components in the second half 26 of the electronic device 22.

The rows between the adjacent ribs 108, which form the tracks 102, are metalized in at least the region of the bumps and the region between the bumps 114 and the circuit member 116.

The body member 100 can be formed by a two shot molding process. A non-platable material is first molded to form the base 106, the ribs 108, the teeth 110 and the protrusion 112. Thereafter, at least the bumps 114 and the portion of the tracks 102 between the bumps 114 and the circuit member 116 are molded with a platable material. Next, the bumps 114 and the portion of the tracks 102 between from the bumps 114 to the circuit member 116 is plated. Alternatively, the bumps 114 and the portion of the track 102 between the bumps 114 and the circuit member 116 may be made of metal (either a single structure or a separate track 102 and bump 114), or the bumps 114 and the track 102 between the bumps 114 and the circuit member 116 may be any combination of metal and platable material.

Figure 9:
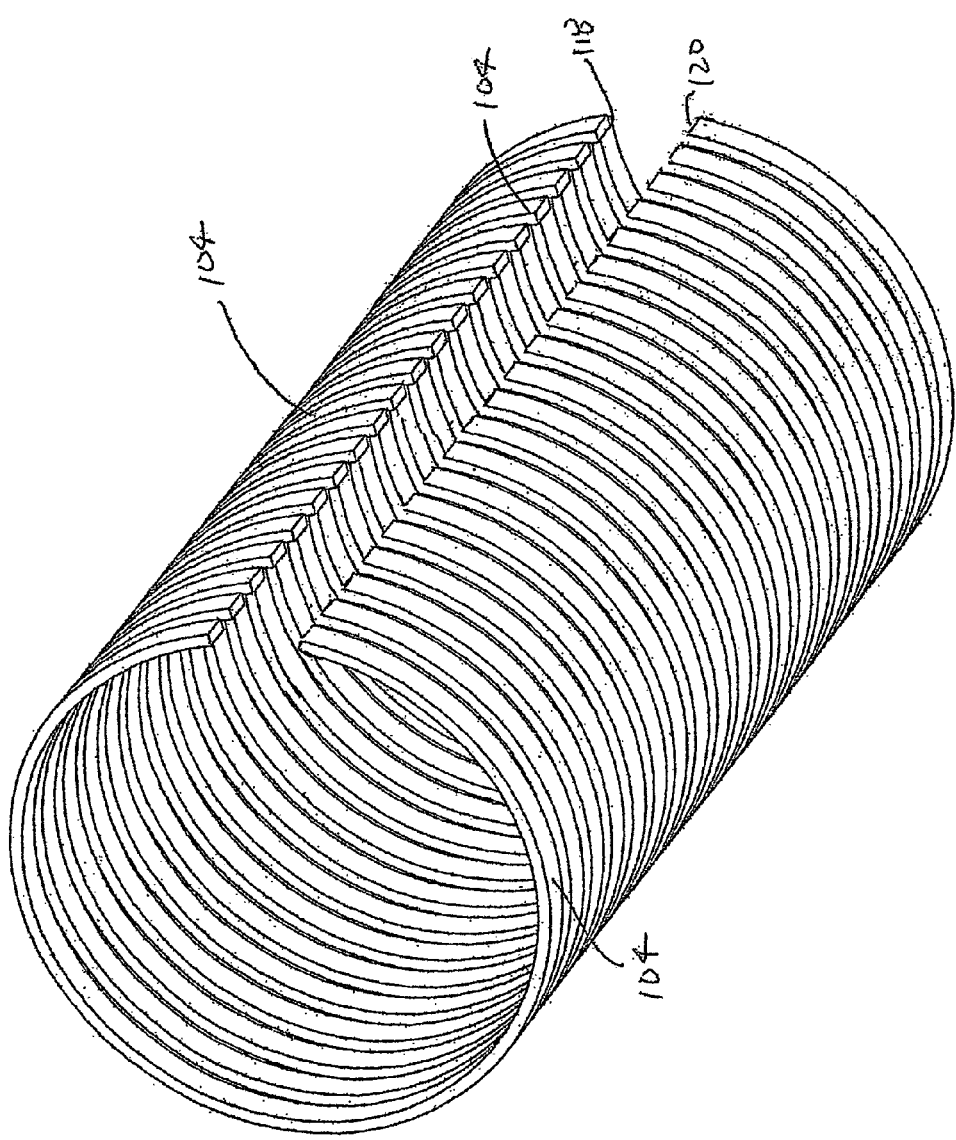
FIG. 9 is a perspective view of the contacts for use on the body member of a third embodiment of the hinge connector of the present application.

As shown in FIG. 9, each contact 104 is generally circular. A space is provided between the ends 118, 120 of the contact 104 to allow the contact 104 to be attached to the body member 100.

Figure 10:
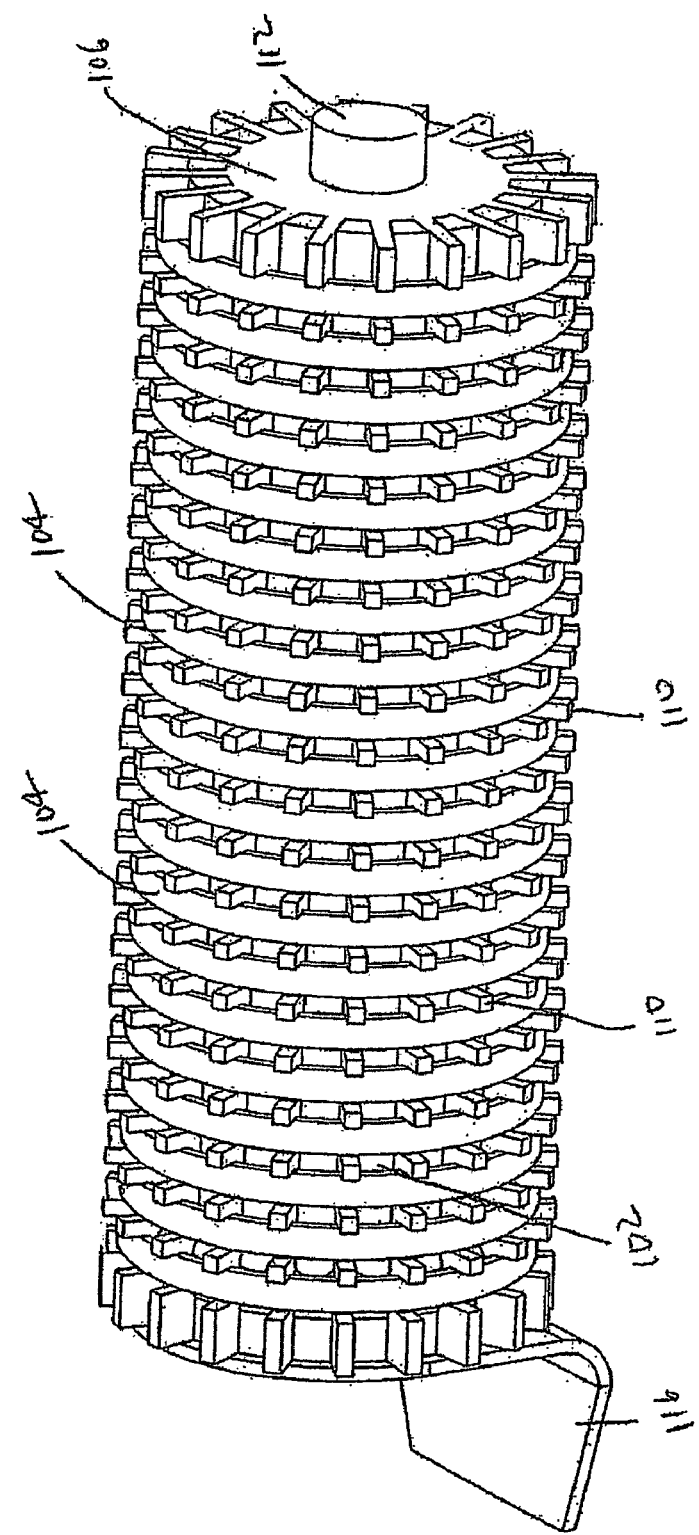
FIG. 10 is a perspective view of the third embodiment of the hinge connector of the present application.
Figure 11:
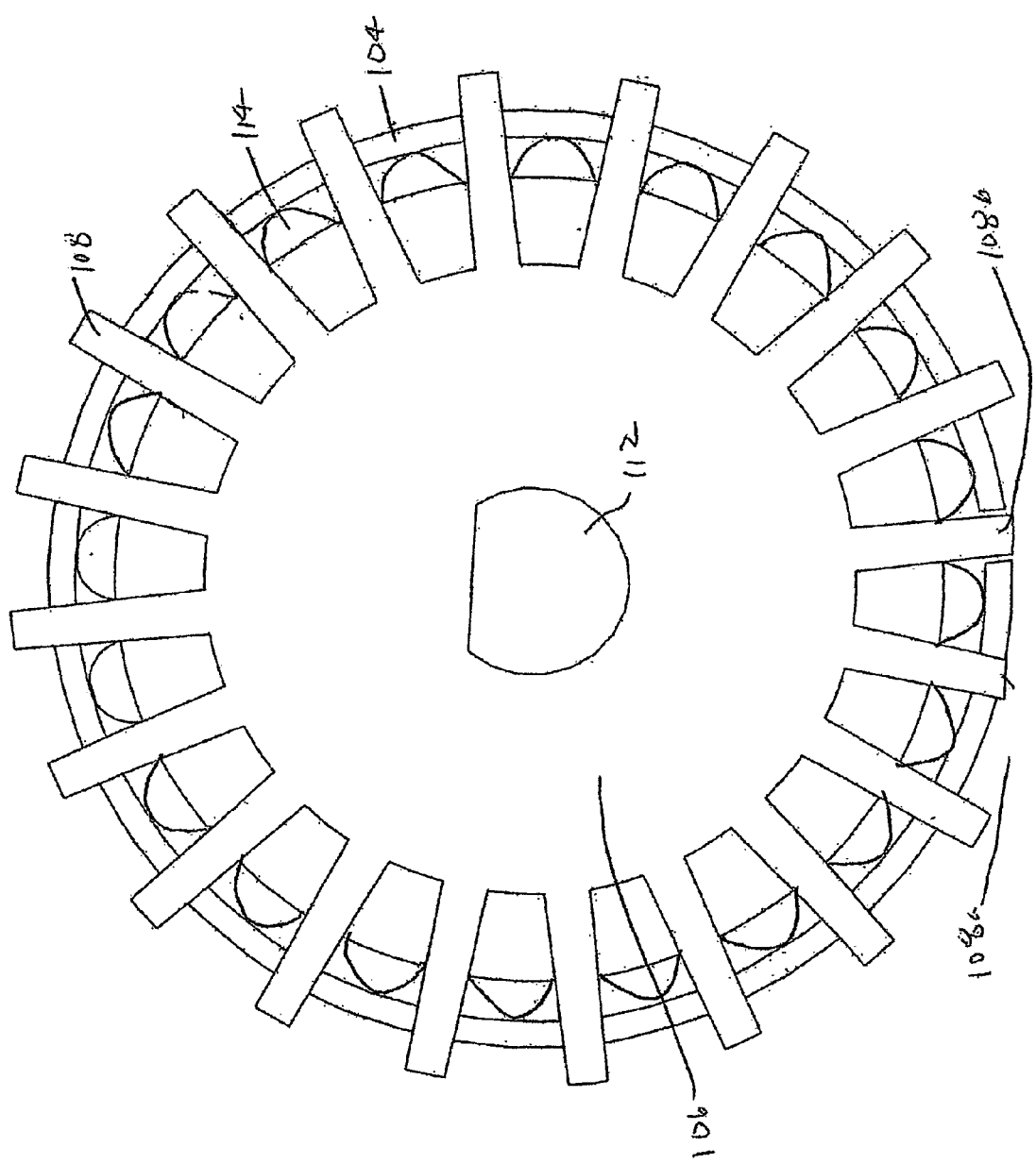
FIG. 11 is an end view of the third embodiment of the hinge connector of the present application.

As shown in FIGS. 10 and 11, when the contacts 104 are attached to the body member 100 by snapping the contacts 104 thereover, a respective contact 104 sits within a respective column. At the point where the bump 114 is provided in the column, the respective contact 104 is electrically mated with the respective track 102. In addition, it is to be realized that the entire row does not need to be conductive. Instead, in each row, only the bump 114 and the portion from the track 102 between the end of the row toward the circuit member 116 needs to be conductive. Although in most applications there will only be one bump 114 per column, this application is not so limited as there may be instances where redundant contact points for a given function may be required.

The contacts 104 may be ganged together by a carrier strip (not shown) at one of the ends 118, 120. Once the contacts 104 are snapped over the body member 100, the carrier strip is separated from the contacts 104.

Figure 12:
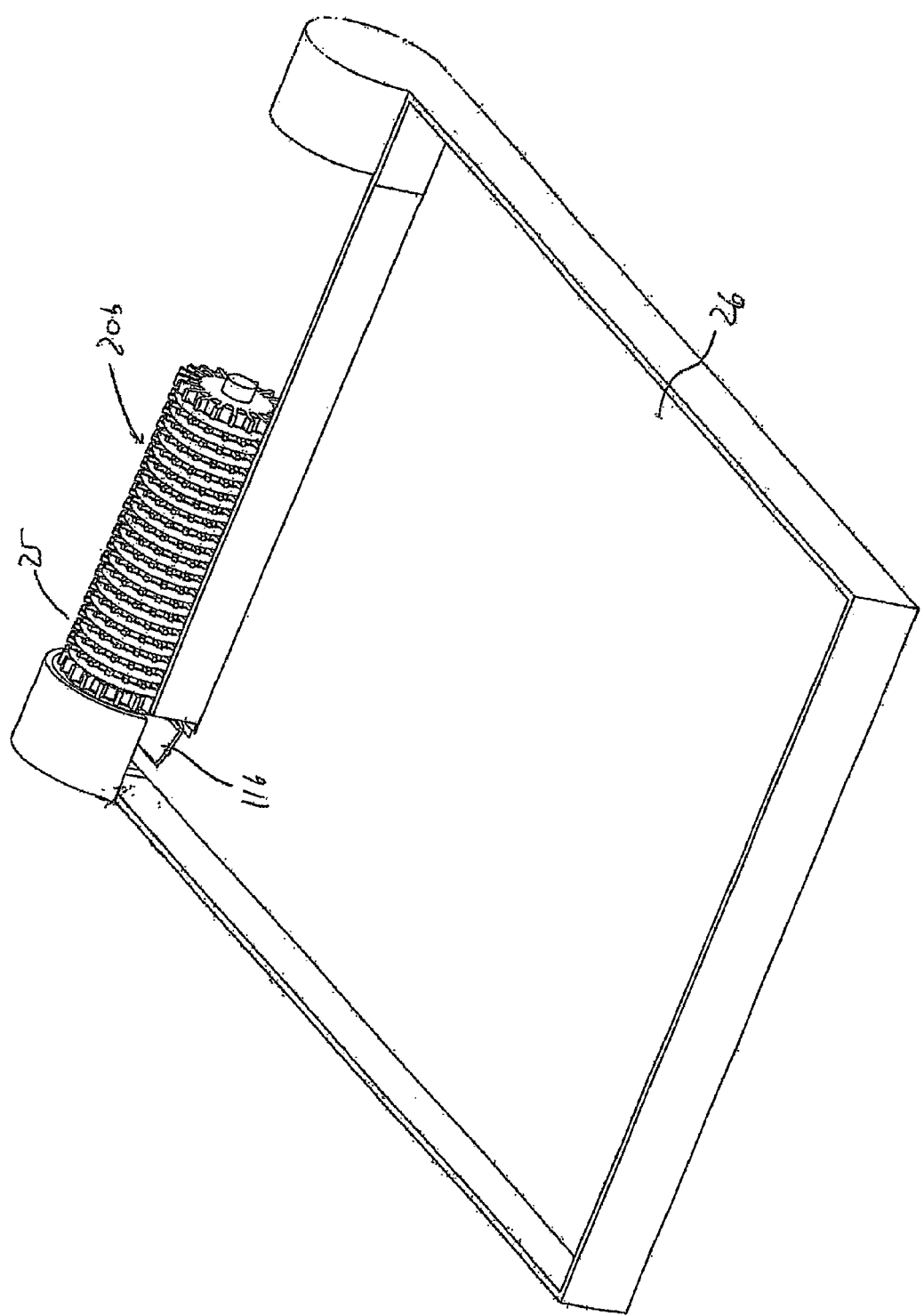
FIG. 12 is a perspective view of the hinge connector of FIG. 11 within the hinge receiving space.
Figure 13:
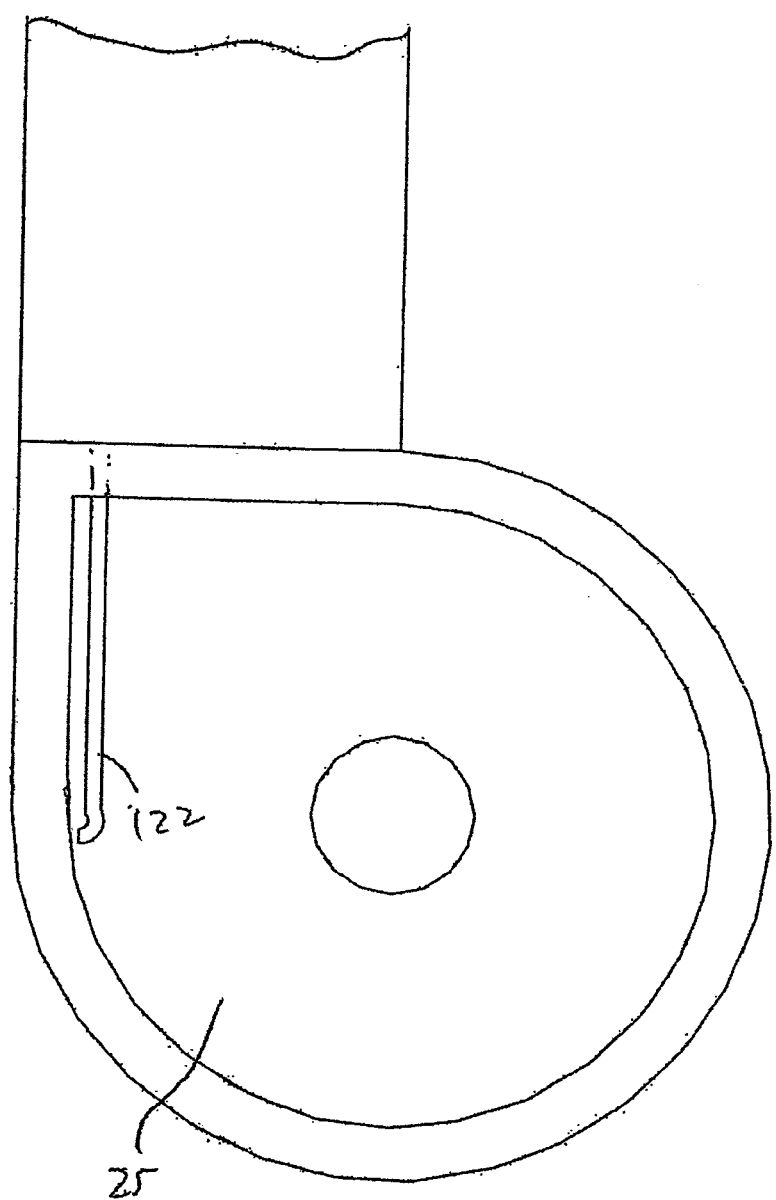
FIG. 13 is an end view of the hinge receiving space of the present application.
Figure 14:
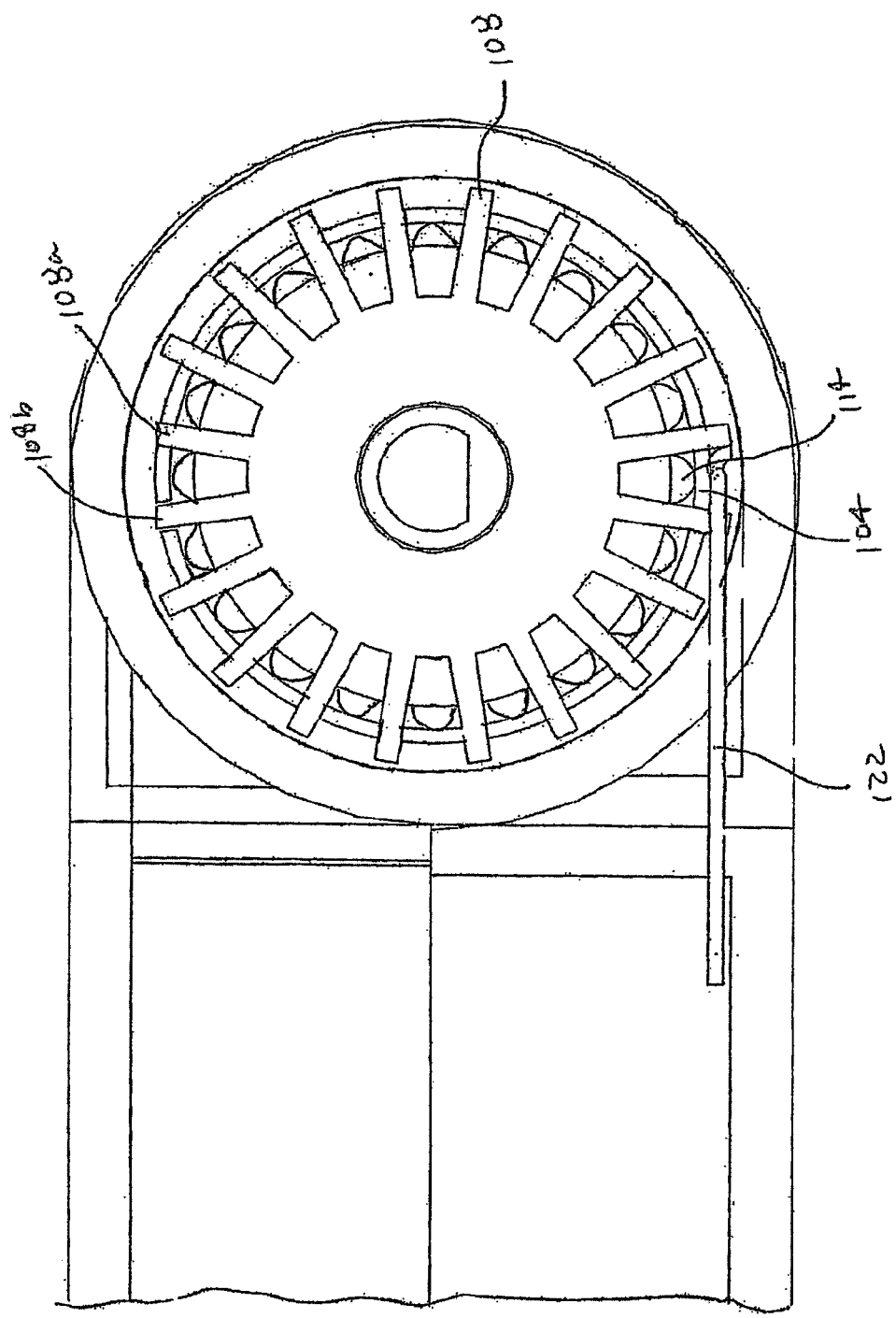
FIG. 14 is an end view of the hinge connector of FIG. 11 within the hinge receiving space.
Figure 15:
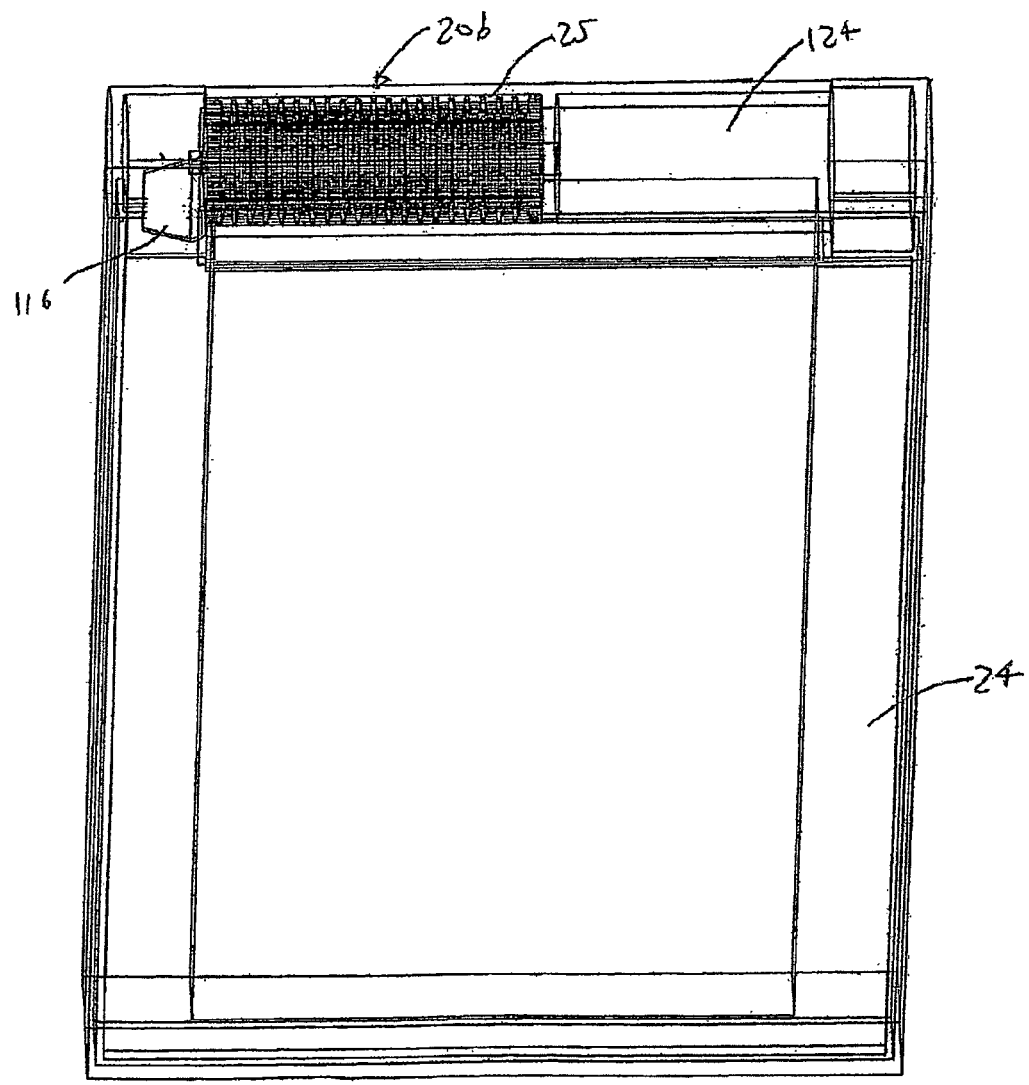
FIG. 15 is a top view of the hinge connector of FIG. 11 within the hinge receiving space.

The hinge receiving space 25 used with this embodiment of the invention is best shown in FIGS. 12 and 13. The first half 24 of the electronic device 22 is not shown in FIG. 12. The hinge receiving space 25 is formed by a hollow knuckle which has a plurality of contacts 122, only one of which is shown, provided therein which is electrically connected to the electrical components of the first half 24 of the electronic device 22. The hinge receiving space 25 has an open end through which the body member 100 with the contacts 104 provided thereon can be inserted. When the body member 100 with the contacts 104 provided thereon is inserted into the hollow knuckle which forms the hinge receiving space 25, the body member 100 is rotated such that the shortened ribs 108a, 108b are aligned with the contacts 122 in the second half 26 of the electronic device 22. The shortened ribs 108a, 108b allow for the body member 100 to slide along inside the hollow knuckle such that the ribs 108 do not interfere with the sliding motion. After the body member 100 with the contacts 104 provided thereon is fully inserted, the body member 100 is rotated to lock the body member 100 in place. Because the contacts 122 will be captured between adjacent ribs 108, the body member 100 cannot move within the hollow knuckle. Space 124 is also provided in the joint between the first and second halves 24, 26 for other components, such as, but limited to, a camera (in the instance where the electronic device may be used for video conferencing).

The electrical connection is therefore provided from the electrical components of the second half 26, through the circuit member 116, along the tracks 102, through the contacts 108, through the contacts 122 and to the electrical components of the first half 24.

When the first half 24 is rotated relative to the second half 26 of the electronic device 22, the hinge connector 20b provides for continuous electrical continuity between the two halves 24, 26. The contacts 122 will slide along the contacts 104 as the first half 24 is rotated relative to the second half 26 of the electronic device 22. The hinge connector 20b is very reliable and will withstand repeated rotation.

If the hinge connector 20b becomes damaged, only the hinge connector 20b will need to be replaced and the connections between the first and second halves 24, 26 reinstated; The entire electronic device 22 does not need to be discarded.

It is to be understood that the ribs 108 do not need to be spaced apart around the circumference of the body member 100. In addition, it is to be understood that more than one bump 114 may be provided in the same row. This is determined by how many of the contacts 104 will be needed to electrically interconnected to that row. Typically, however, only one bump 114 per row is used.

Attention is invited to another embodiment of the hinge connector 20c shown in FIGS. 16 and 17. The hinge connector 20c is very similar to the third embodiment of the hinge connector 20b. The hinge connector 20c includes a barrel or body member 200 formed of a dielectric material, such as plastic, that has tracks 202 thereon and a plurality of conductive contacts 204 that are mated with the body member 200 and tracks 202.

The body member 200 has a generally semi-circular base 206, which has a plurality of spaced apart ribs 208 extending along the length thereof and around the circumference thereof. Each rib 208 extends radially outwardly from the cylindrical base 206. Each rib 208 has a plurality of spaced apart teeth 210 provided thereon along the length thereof. Each tooth 210 is generally square. The individual teeth 210 in the respective ribs 208 are aligned with each other around the circumference of the base 206. A protrusion 212, only half of which is shown in FIG. 16, is provided at one end of the base 206. As such, the body member 200 has a plurality of rows (the portions between the ribs 208) and a plurality of columns (the aligned spaces between the teeth 210). The rows and columns intersect each other. The body member 200 has a plurality of spaced apart apertures 226 formed between two of the ribs 208. A circular body member is formed in two half body members 200 abutted against each other to form a circular body member. The same mold can be used to form the two halves. This is effected for ease in forming a circular body member.

A bump 214 is provided along each row. The bump 214 protrudes outwardly from the base 206 in the same direction as the ribs 208. The body member 200 may be formed such that the bumps 214 are staggered such that only one bump 214 is provided per row and column.

The rows between the adjacent ribs 208, which form the tracks 202, are at least partially conductive. In addition, the bumps 214 are conductive.

Each body member 200 can be formed in a manner similar to the body member 100, recognizing that the difference between the two resides in the fact that body member 200 is semi-circular, whereas body member 100 is circular.

Likewise, a circuit member, as in the case of the circuit member 116 used with body member 100, can be used to electrically attach the hinge connector using body members 200 to in the second half 26 of the electronic device 22.

As shown in FIG. 17, each contact 204 is generally circular. A space is provided between the ends 218, 220 of the contact 204. One of the ends 220 of each contact 204 has a curved end portion 228 which curves inwardly toward the center of the contact 204.

When the contacts 204 are attached to the body member 200 by snapping the contacts 204 thereover, a respective contact 204 sits within a respective column. The curved end portion 228 of the respective contact 204 is seated within the respective aperture 226 in the body member 200. Whereas the embodiment shown illustrates the use of an aperture for receiving the curved end portions 228 of the terminals, this function can be accomplished by other means, such as a slot for receiving the curved end portions 228. Moreover, this feature is not limited solely to this embodiment of the invention, but can be applied to the other embodiments shown and described herein. Additionally, the ends of the terminals do not have to be curved prior to installing the terminals into the aperture. Rather, the ends can become curved by virtue of placing the ends of either curved or straight terminals within the aperture and then bending the terminals to fit within the respective columns.

At the point where the bump 214 is provided in the column, the respective contact 204 is electrically mated with the respective track 202. In addition, it is to be realized that the entire row does not need to be conductive. Instead, in each row, only the bump 214 and the portion from the bump 214 to the end of the row toward the circuit member, which would be similar to the circuit member 116 of the previous embodiment, needs to be conductive. Although in most applications there will only be one bump 214 per column, this application is not so limited as there may be instances where redundant contact points for a given function may be required.

The contacts 204 may be ganged together by a carrier strip (not shown) at one of the ends 218, 220 as with the contacts 104 described previously.

The hinge receiving space 25 used with this embodiment of the invention is identical to that of the embodiment shown in FIGS. 12 and 13 and, as such, is not re-described. When the body member 200 with the contacts 204 provided thereon is inserted into the hollow knuckle which forms the hinge receiving space 25, the body member 200 is rotated such that the portion of the body member 200 where the apertures 226 are provided is aligned with the contacts 122 in the second half 26 of the electronic device 22. The portion of the body member 200 where the apertures 226 are provided allow for the body member 200 to slide along inside the hollow knuckle such that the ribs 208 do not interfere with the sliding motion. After the body member 200 with the contacts 204 provided thereon is fully inserted, the body member 200 is rotated to lock the body member 200 in place. Because the contacts 204 will be captured between adjacent ribs 208, the body member 200 cannot move within the hollow knuckle.

The electrical connection is therefore provided from the electrical components of the second half 26, through the circuit member, along the tracks 202, through the contacts 204, through the contacts 122 and to the electrical components of the first half 24.

When the first half 24 is rotated relative to the second half 26 of the electronic device 22, the hinge connector 20c provides for continuous electrical continuity between the two halves 24, 26. The contacts 122 will slide along the contacts 204 as the first half 24 is rotated relative to the second half 26 of the electronic device 22. The hinge connector 20c is very reliable and will withstand repeated rotation.

If the hinge connector 20c becomes damaged, only the hinge connector 20c will need to be replaced and the connections between the first and second halves 24, 26 reinstated. The entire electronic device 22 does not need to be discarded.

It is to be understood that the ribs 208 do not need to be evenly spaced apart around the circumference of the body member 200. In addition, it is to be understood that more than one bump 214 may be provided in the same row. This is determined by how many of the contacts 204 will be needed to electrically interconnected to that row. Typically, however, only one bump 214 per row is used.

While preferred embodiments of the present invention are shown and described, it is envisioned that those skilled in the art may devise various modifications of the present invention.

It will be understood that the invention may be embodied in other specific forms without departing from the spirit thereof. The present examples and embodiments, therefore, are to be considered in all respects as illustrative and not restrictive, and the invention is not to be limited to the details given herein.

The invention claimed is:

1. A hinge for an electronic device comprising:
 a body member having a conductive surface provided thereon, at least one rib provided on the body member between each of the conductive surfaces and extends outwardly from the body member;
 a non-conductive housing;
 a plurality of conductive contacts connected together by said housing, respective ones of the contacts being in electrical contact with respective ones of the conductive surfaces, the contacts and housing being capable of movement relative to the conductive surfaces, yet said contacts always maintaining electrical contact with the conductive surfaces throughout the movement of the contacts and housing relative to the conductive surfaces.

2. A hinge as defined in claim 1, further including a flex circuit electrically connected to the plurality of conductive surfaces.

3. A hinge as defined claim 1, wherein the plurality of conductive surfaces are formed by plating a metal onto the body member.

4. A hinge as defined in claim 1, wherein the body member has opposite ends and further comprising a protrusion extending outwardly from each end of the body member, and wherein the housing includes opposite end portions, each end portion having a recess therein, respective protrusions being mounted in the respective recesses.

5. A hinge as defined in claim 1, wherein the body member in cross-section is formed from a first section which is arcuate shaped and a second section which is angled relative to the first section and connected to an end of the first section, the contact contacting the first and second sections during movement.

6. A hinge as defined in claim 5, wherein said body member further includes a third section which is flat and is provided between said first and second sections.

7. The hinge of claim 6 in combination with a printed wiring board, wherein the third section of the body member is attached to the printed wiring board.

8. A hinge as defined in claim 1, wherein the plurality of contacts are capable of sliding movement relative to the conductive surfaces.

9. A hinge as defined in claim 1, wherein said non-conductive housing has an opening therein and said plurality of conductive contacts extend through said opening such that opposite free ends are provided on each conductive contact, respective ones of the contacts having one of said free ends being mated with respective ones of the conductive surfaces and the other of the free ends extending from said housing for connection to an associated member, the housing and contacts being capable of movement relative to the conductive surfaces, yet always maintaining electrical contact with the conductive surfaces throughout the movement of the contacts relative to the conductive surfaces.

10. A hinge for an electronic device comprising:
a body member having a plurality of conductive surfaces provided thereon, each of the plurality of conductive surfaces being formed from a row and a column which are electrically connected to each other, the column extending at least partially around the body member and the row extending along at least a portion of a length of the body member; and
a plurality of conductive contacts, respective ones of the contacts being associated with respective ones of the conductive surfaces, the contacts being capable of movement relative to the conductive surfaces, yet always maintaing electrical contact with the conductive surfaces throughout the movement of the contacts relative to the conductive surfaces.

11. A hinge as defined in claim 10, wherein each row includes at least one conductive bump thereon for providing an electrical connection between the row and a respective one of the columns.

12. A hinge as defined in claim 11, wherein each column is formed from a metal track which is detachable from the body member.

13. A hinge as defined in claim 12, wherein each row is formed by plating a metal surface onto the body member.

14. A hinge as defined in claim 10, further including a flex circuit electrically connected to each of the rows.

15. A hinge as defined in claim 10, further including at least one rib provided on the body member between each of the rows.

16. A hinge as defined in claim 10, further including at least one rib provided on the body member between each of the columns.

17. A hinge as defined in claim 10, further including a plurality of ribs provided on the body member between each of the columns and predetermined ones of the ribs are shorter in height than the remainder of the ribs.

18. A hinge as defined in claim 10, further including at least one rib provided on the body member between each of the rows and at least one rib provided on the body member between each of the columns.

19. A hinge as defined in claim 10, further including a plurality of spaced apart apertures provided on the body member, respective ones of the apertures aligning with respective ones of the columns.

20. A hinge as defined in claim 10, wherein each column is formed from a metal track which is detachable from the body member, each track including a portion which engages into the respective aperture.

21. A hinge as defined in claim 10, wherein said body member is generally cylindrical.

22. A hinge as defined in claim 10, wherein said body member is formed from two halves which when assembled form a cylinder.

23. A hinge for an electronic device comprising:
a plurality of body members, each body member including a base wall, an aperture through said base wall, and a pair of walls extending outwardly from the base wall;
a conductive contact associated with each body member, each contact including coiled spring mounted between the pair of walls of the respective body member, abutting against the base wall of the respective body member and surrounding the aperture of the respective body member, a first end of each coiled spring extending outwardly from the respective body member, and a second end of each coiled spring extending outwardly from the respective body member;
the apertures of said respective body members being aligned, and further including a pin provided through the apertures for joining said body members together.

24. A hinge as defined in claim 23, wherein each body member further includes a wall surrounding the aperture which extends outwardly from the base wall in the same direction as the pair of walls.

* * * * *